(12) United States Patent
Buabbud et al.

(10) Patent No.: US 6,898,206 B2
(45) Date of Patent: May 24, 2005

(54) WAVELENGTH DIVISION MULTIPLEXED (WDM) RING PASSIVE OPTICAL NETWORK (PON) WITH ROUTE PROTECTION FOR REPLACEMENT OF SPLITTER BASED PASSIVE OPTICAL NETWORKS

(75) Inventors: George H. Buabbud, South Lake, TX (US); Muneer Zuhdi, Lewisville, TX (US); Ulrich Trick, Bad Soden (DE); Thomas Volk, Buseck (DE); Debra D. Wawro, Arlington, TX (US)

(73) Assignee: Advanced Fibre Access Corporation, Petaluma, CA (US)

( * ) Notice: Subject to any disclaimer, the term of this patent is extended or adjusted under 35 U.S.C. 154(b) by 918 days.

(21) Appl. No.: 09/876,439

(22) Filed: Jun. 6, 2001

(65) Prior Publication Data

US 2002/0186439 A1 Dec. 12, 2002

(51) Int. Cl.$^7$ .............................................. H04L 12/66
(52) U.S. Cl. ........................ 370/463; 370/535; 398/59
(58) Field of Search .................................. 370/463, 466, 370/532, 535–537; 398/58–59, 20, 167, 141–142; 714/22

(56) References Cited

U.S. PATENT DOCUMENTS

| | | | | | |
|---|---|---|---|---|---|
| 4,742,572 A | * | 5/1988 | Yokoyama | .................... | 398/59 |
| 5,426,644 A | * | 6/1995 | Fujimoto | .................... | 370/535 |
| 5,818,846 A | * | 10/1998 | Mori et al. | ................. | 370/532 |
| 5,898,828 A | * | 4/1999 | Pignolet et al. | ............... | 714/22 |
| 6,049,550 A | * | 4/2000 | Baydar et al. | .............. | 370/466 |

* cited by examiner

Primary Examiner—Duc Ho
Assistant Examiner—Phuongchau Ba Nguyen
(74) Attorney, Agent, or Firm—Jones Day

(57) ABSTRACT

A method and apparatus for low cost upgrading on demand of an optical fiber communication system without installing additional optical fiber and minimal installation of optical circuitry at destination and distribution terminals. The upgraded systems comprise an optical data loop of a plurality of destination terminals and a single intermediate terminal.

8 Claims, 7 Drawing Sheets

WAVELENGTH DIVISION MULTIPLEXED (WDM) RING PASSIVE OPTICAL NETWORK (PON) WITH ROUTE PROTECTION FOR REPLACEMENT OF SPLITTER BASED PASSIVE OPTICAL NETWORKS

BACKGROUND OF THE INVENTION

1. Field of the Invention

The present invention relates to methods and apparatus associated with broadband communications using optical fibers as the transmission media, and more specifically to methods and apparatus for on-demand upgrading of an existing optical network system with the capacity to service additional subscribers with broadband digital service with no installation of additional optical fibers and minimal replacement of existing infrastructure.

2. Description of Related Art Including Information Disclosed Under 37 CFR 1.97 and 1.98

The telecommunications industry is using more and more optical or light fibers in lieu of copper wire. Optical fibers have an extremely high bandwidth thereby allowing the transmission of significantly more information than can be carried by a copper wire. The carried information includes broadband digital data carrying digital television signals, computer data, etc.

Of course, modern telephone systems require bidirectional communications where each station on a communication channel can both transmit and receive. This is true, of course, whether the system uses electrical wiring or optical fibers as the transmission medium, and whether the information is simple analog voice or broadband digital signals. Early telephone communication systems solved this need by simply providing separate copper wires for carrying the communications in each direction. Some early attempts at using optical fibers as a transmission medium followed this example and also used two different optical fibers such as optical fibers 10 and 10A in the prior art FIG. 1 for carrying the communications in each direction. As shown, in the prior art FIG. 1, fiber 10 is connected by an optical coupler 12 to an LED (light-emitting diode) 14 at one end and by optical coupler 16 to a PD (photodetection diode) 18 at the other end. Similarly, but in reverse, fiber 10A is connected by an optical coupler 16A to PD 18 at one end and by optical coupler 12A to LED 14 at the other end.

However, because of the extremely high bandwidths capable of being transmitted by an optical fiber, a single fiber is quite capable of carrying communications in both directions. One technique is WDM (wavelength divisional multiplexing) which is shown in the prior art FIG. 2 and uses different wavelengths for each direction of travel. Components in FIG. 2 and subsequent figures which operate the same as shown in FIG. 1 carry the same reference numbers. In the embodiment shown in FIG. 2, a central office 20 is connected to an immediate or RT (remote terminal) 22 by at least one pair of optical fibers 10B. The remote terminal 22 may be further connected to a multiplicity of destination terminals by other pairs of optical fibers. As shown, the central office includes a light-emitting diode 14 optically connected to fiber optics 10 by optical coupler 12 for converting electrical signals to optical signals and a photodetection diode 18A optically connected to optical fiber 10A by a coupler 16A for converting optical signals to electrical signals. The fiber optics 10 and fiber optics 10A are each connected to a wavelength division multiplexer 24 which in turn is connected by optical coupler 26 to optical fiber 10B. This arrangement is duplicated at the RDT 22 by light-emitting diode 14A, photodetection diode 18, and wavelength division multiplexer 24A. It will, of course, be appreciated that although the figure is shown as providing communications between a central office 20 (station 1) and a remote terminal office 22 (station 2) prior to being further distributed to a multiplicity of destinations, the communications system could be used for providing communications between any two types of stations, examples include communication between two central offices, two remote terminal offices, or between a remote office and an individual user's location, etc. A typical communications system using an LED (light-emitting diode) and a PD (photodiode) with a single optical fiber is disclosed in U.S. Pat. No. 5,075,791 entitled "Method and Apparatus for Achieving Two-Way Long-Range Communication Over an Optical Fiber", issued to Mark W. Hastings, and incorporated in its entirety hereby by reference.

Yet another technique for using a single optical fiber 10 for telephone systems is illustrated in the prior art FIG. 3. The illustrated figure is referred to as TCM (time compression multiplexing). The system operates at a single frequency and uses a single optical fiber 10 and a single diode 30 and 30A at each end connected by optical couplers 32 and 32A, respectively, for both converting electrical signals to optical signals and for receiving optical signals and converting those optical signals to electrical signals. TCM systems have the obvious advantage of requiring fewer components.

Still other and more advanced systems carry telephony communication (either analog or digital) at one wavelength of light and television signals (digital and/or analog) at another wavelength.

However, as mentioned above, optical fibers have extremely high bandwidths and use of an optical fiber for any of the above-mentioned existing systems is a very ineffective use of the fiber and, in fact, the available bandwidth of an optical fiber makes it possible to use both active and passive optical transmission techniques which can be used to carry a significantly-increased number of individual bidirectional broadband communication channels or signals.

Of course, where early types of optical transmission systems have been installed, it is desirable to limit the time the operation of such systems is disrupted. Further, once an early type fiber-optic telephone system is installed, wholesale removal and replacement with a new system would normally be prohibitive from a cost point of view. Therefore, it would be advantageous to be able to upgrade on a demand basis an existing fiber-optic system to also carry a significantly increased number of broadband communication channels.

SUMMARY OF THE INVENTION

It is an object of this invention to provide methods and apparatus for upgrading an optical communication transmission system so that it can carry a significantly-increased number of broadband bidirectional channels.

It is another object of the invention to provide a method and apparatus to upgrade an existing optical communication transmission system without extensive installation of new optical fibers.

It is still another object of the invention to provide methods and apparatus to upgrade a communication transmission system with minimal addition of new components.

It is yet another object of the invention to allow upgrading of a optical fiber communication transmission system to occur on an on-demand-basis.

The present invention accomplishes these and other objects in an existing optical fiber communication system which carries information between a multiplicity of destination terminals through a second location such as a remote or intermediate terminal to a primary terminal such as a central office. The optical fiber communication system includes a multiplicity of optical fiber pairs each of which has one end which terminates one each at the multiplicity of destination terminals and terminates at the other end at an intermediate terminal or distribution apparatus. Selected ones of the multiplicity of destination terminals include an OIU (optical interface unit) for extracting and injecting data with respect to light waves that are received at an input of the optical coupler OIU which is connected to one of the fibers of the pair associated with that terminal. Light waves receiving new data at the OIU are then connected to the other fiber of the pair by an output optical coupler. The communication system also includes at least a pair of optical fibers extending between a primary terminal or location and the intermediate terminal or distribution apparatus.

To upgrade the existing optical network or communication system, an optical combining device such as a coupler/splitter located in the intermediate terminal includes a plurality of input optical connectors and an output optical connector. There is also an optical separating device which may also be a coupler/splitter included at the intermediate terminal having an input optical connector and a plurality of output optical connectors. A transmission loop comprising a plurality of the destination terminals which include an OIU and a like plurality of corresponding pairs of optical fibers is formed by selectively connecting the fibers of each pair at the intermediate terminal. To aid understanding of how the transmission loop is formed, it is worthwhile to arbitrarily designate that the end of a first fiber of each of the corresponding pair of fibers terminates at the intermediate terminal with a first optical connector and the end of the second fiber of each pair terminates at the intermediate terminal with a second optical connector. At the destination terminal each first fiber of the plurality of pairs are connected to the output optical connectors of the OIU and the second fiber of each plurality of pairs are connected to the input optical connectors of the OIU.

At the intermediate or distribution terminal end, each first optical connector of the first optical fiber of a pair of fibers is connected to the second optical connector of the second optical fiber of another pair of fibers. This is true for each of the plurality of pairs terminating at the intermediate terminal except the first optical coupler of a first fiber of a selected "first" pair is connected to the input connector of the optical combining device, and the second optical connector of a second fiber of a "last" pair is connected to the output connector of the optical splitting device. Lastly, an output optical connector of the combining or coupler device is connected to a first fiber of a primary pair routed between the intermediate terminal and a primary terminal and the input connector of the optical separating or splitting device is connected to the second fiber of the primary pair.

BRIEF DESCRIPTION OF THE DRAWINGS

Features of the present invention will be more fully disclosed when taken in conjunction with the following Detailed Description of the Preferred Embodiment(s) in which like numerals represent like elements and in which.

DESCRIPTION OF THE INVENTION

Figure 1:
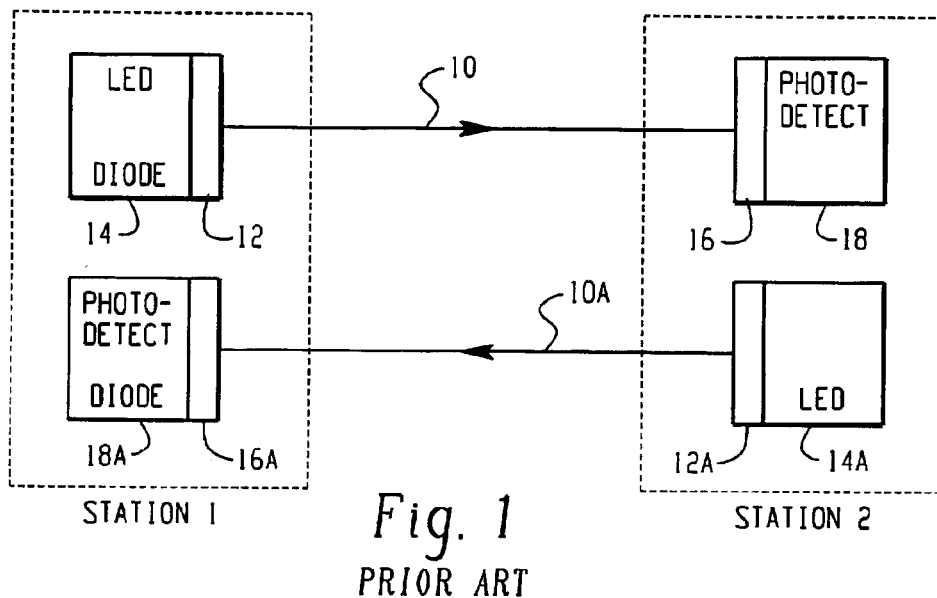
FIG. 1 is a block diagram of a prior art fiber optical communication system using two fibers to obtain bidirectional communication.
Figure 2:
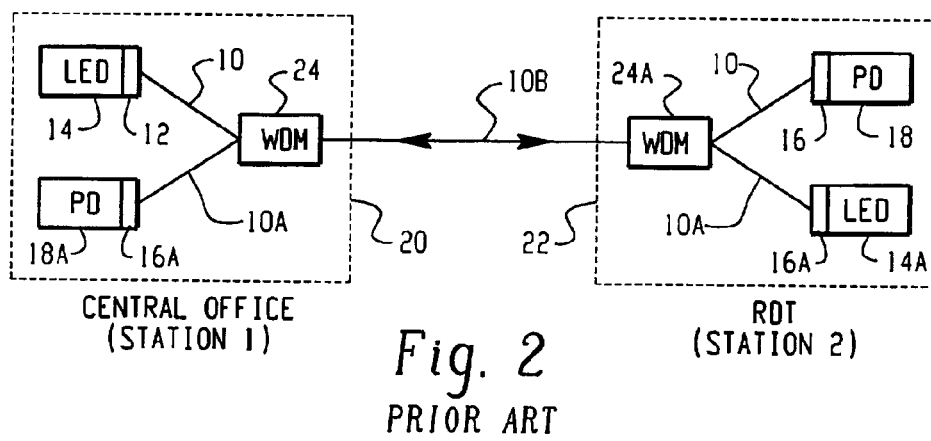
FIG. 2 is a block diagram of another prior art bidirectional fiber-optic communication system using a single transmission fiber having a light-emitting diode and a photodetection diode at each end of the fiber.
Figure 3:
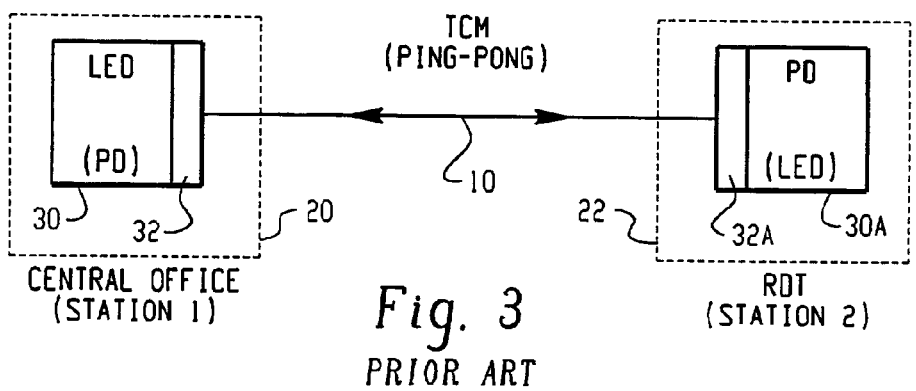
FIG. 3 is a block diagram of a prior art fiber optical communication system using a single fiber and a single transmit/receive diode at each end suitable for TCM.
Figure 4:
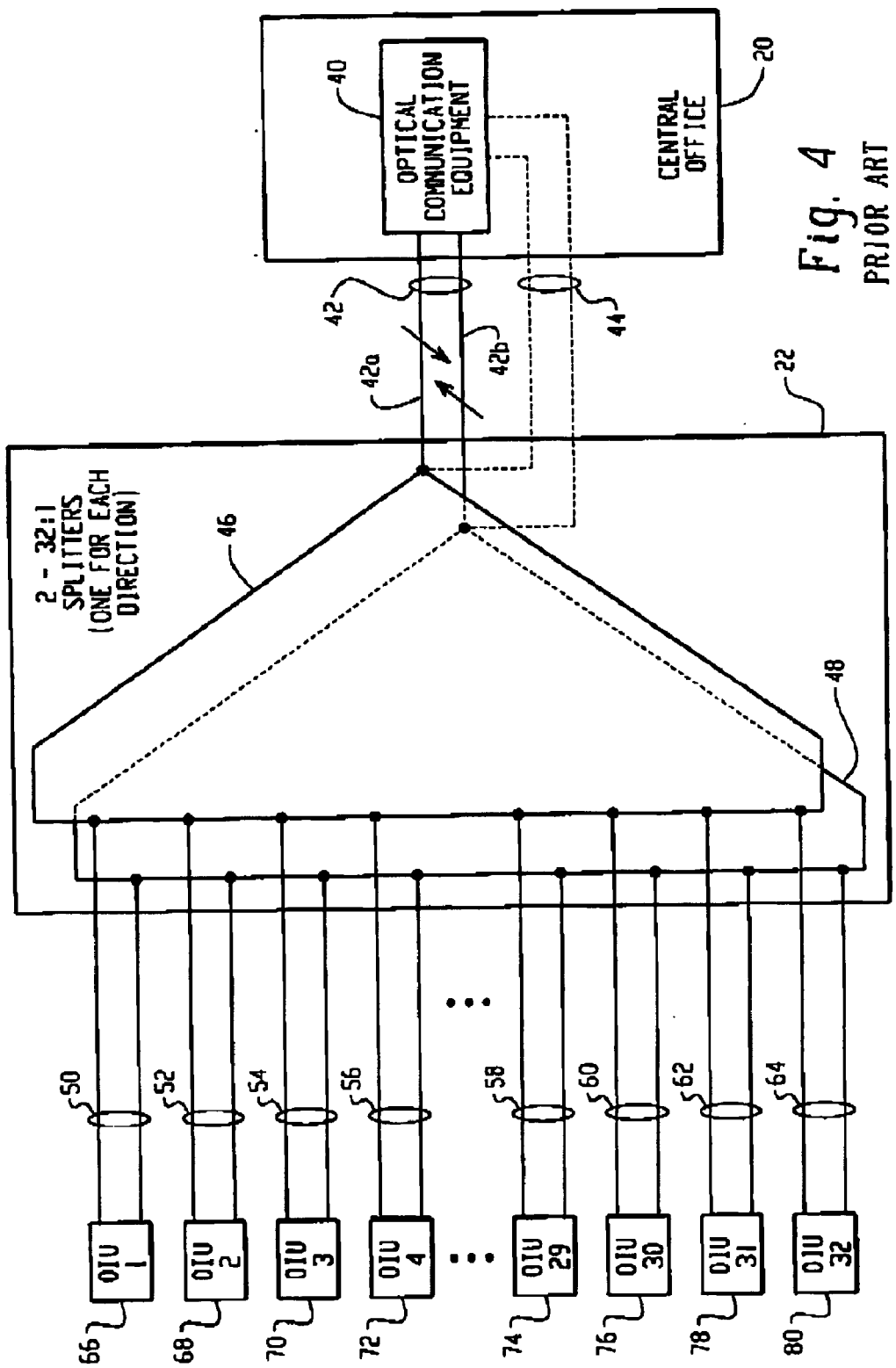
FIG. 4 is a schematic of a prior art Passive Optical Fiber distribution network suitable for being upgraded by the teachings of this invention.

Referring now to FIG. 4, there is shown a bidirectional, passive optical network system. Elements of the system similar to elements discussed with respect to the prior art system of FIGS. 1, 2 and 3 carry common reference numbers. As shown, there is provided an intermediate distribution terminal 22 which is connected to optical communication equipment 40 at central office 20 by at least one primary pair of optical fibers 42, and preferably by two primary pairs of optical fibers 42 and 44. It is not uncommon for a spare pair of optical fibers to extend between an intermediate distribution terminal and a central office. Intermediate distribution terminal 22 is shown as including an optical splitter device 46 connected to one of the optical fibers 42a of fiber pair 42 and an optical combining device 48 connected to the other fiber 42b of fiber pair 42. It should also be noted that, although the pair of fibers 42 are illustrated in the figure with the two individual fibers 42a and 42b traveling together in a common sheath, such an arrangement, although common, is not necessary. The two individual fibers could be completely separate and independent of each other. All that is necessary is that the two separate fibers start and end at the same location. As indicated in FIG. 4, optical splitter device 46 and optical combining device 48 may typically be devices having a ratio of 32:1. That is, the devices either receive light from or transmit light to thirty-two optical fibers, and this received or transmitted light is carried by a single fiber after either being split or combined, whichever is appropriate. For example, splitter 46 receives light carrying information from fiber 42a of fiber pair 42 and splits the light into, for example only, thirty-two portions which are coupled to one of the fibers of thirty-two different pairs of fibers such as pairs 50, 52, 54, 56, 58, 60, 62 and 64 between intermediate terminal 22 and thirty-two destination terminals such as the thirty-two OIUs (optical interface unit), 66, 68, 70, 72, 74, 76, 78 and 80 found in thirty-two destination terminals at thirty-two different locations. Likewise, combining device 48 located in intermediate terminal 22 receives light from the thirty-two OIUs on the other fiber of each of the fiber pairs 50 through 64, combines the received light and couples it to the single fiber 42b of fiber pair 42 such that it is transmitted to optical communication equipment 40 at central office 20. Thus, in the example shown in FIG. 4, there are thirty-two separate OIUs which may be installed at thirty-two distinct and separate locations including OIU 66 through 80 which are connected by one of the fibers of each of the thirty-two pairs of optical fibers 50 through 64 to the optical splitter device 46 in intermediate terminal 22. The thirty-two OIUs are also connected by the other fiber of each pair to the optical combining or coupler unit 48 which is also located in intermediate terminal 22. It will appreciated that the thirty-two OIUs, the thirty-two pairs of corresponding optical fibers and the 32:1 splitter unit 46 and 32:1 combining unit 48 represents a typical prior art passive optical network system. Also, as was discussed above with respect to individual fibers 42a and 42b which make up pair 42, it is not necessary that the individual fibers of the pairs 50 through 64 or any other pair of optical fibers discussed herein, run side by side in a common sheath. It is only necessary that the individual fibers in a pair start and terminate at the same locations. Other prior art systems may use equipment which supports a number of destination terminals and corresponding pairs of optical fibers which is different than thirty-two.

Figure 5:
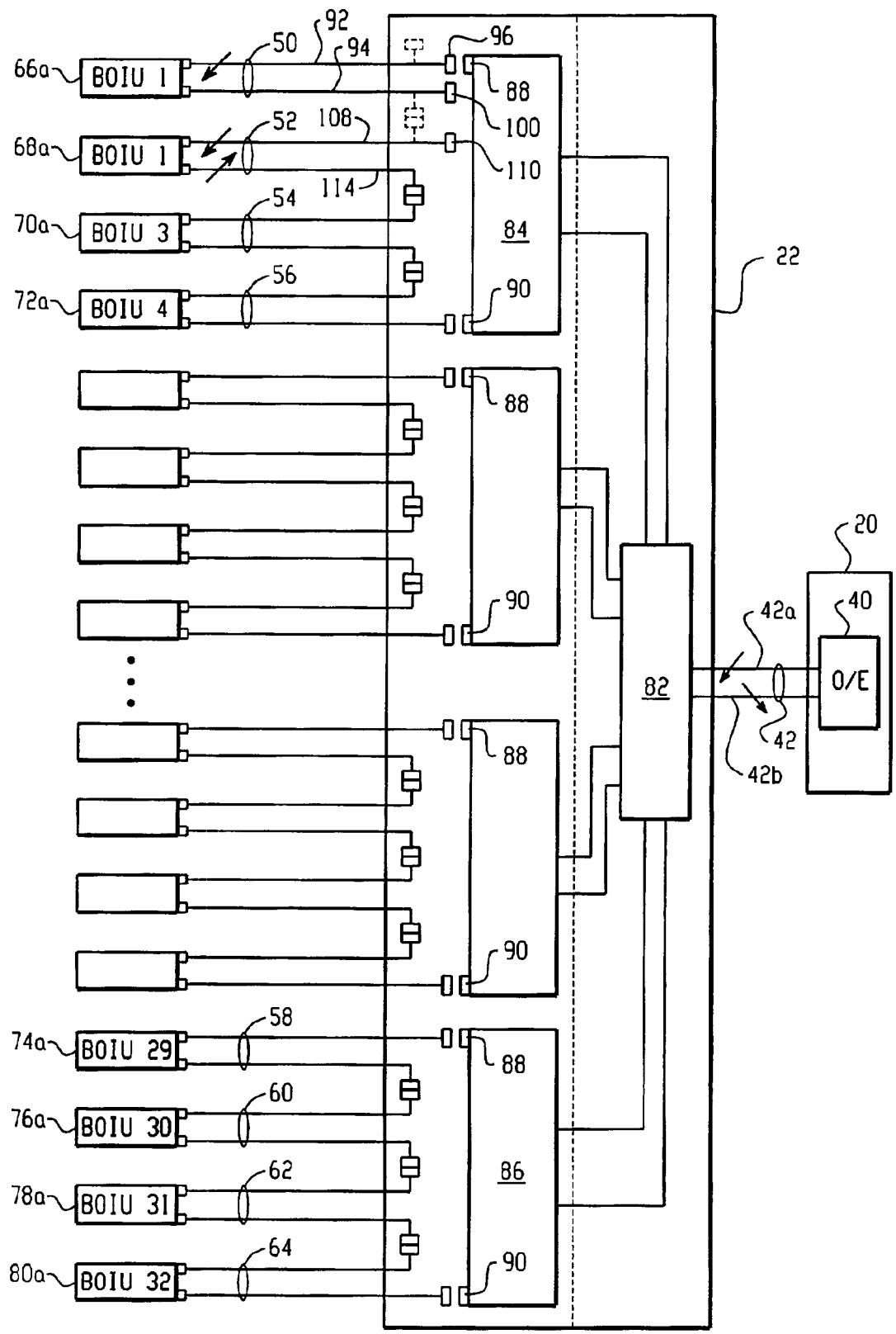
FIG. 5 illustrates a first embodiment of the invention for upgrading the optical network of FIG. 4 to an active optical network with minimal new equipment and without the installation of additional optical fibers.

Referring now to FIG. 5, there is shown a first embodiment wherein an existing passive optical network such as was discussed with respect to FIG. 4 is suitable for being upgraded to an active optical network system for carrying broadband data signals. Those elements of FIG. 5 which are the same as those discussed with respect to FIG. 4 continue to carry the same reference numbers. As shown, a primary pair of optical fibers 42 having individual fibers 42a and 42b extends between optical equipment 40 in the central office 20, and optical to electrical conversion equipment 82 in the intermediate distribution terminal 22. Also similar to the optical network system shown in FIG. 4, there are included thirty-two corresponding pairs of optical fibers (including the representative eight pairs of optical fibers 50 through 64) which extend between intermediate terminal 22 and thirty-two separate destination terminals, each of which in the embodiment of FIG. 5 contains a BOIU (broadband optical interface unit) such as represented by BOIUs 66a, 68a, 70a, 72a, 74a, 76a, 78a and 80a. In addition to optical/electrical data converting equipment 82 located in intermediate terminal 22, there are also included optical communication units such as units 84 and 86 each of which includes an output optical connector 88 and an input optical connector 90.

As was discussed above with respect to FIG. 4, a pair of optical fibers extend between the intermediate terminal 22 and each of the BOIUs 66a through 80a. As an example, the pair of optical fibers 50 include a first fiber 92 and second fiber 94, and as a further example, and only for convenience, the first fiber 92 is shown carrying light from to intermediate terminal 22 to BOIU 66a whereas the second fiber 94 is shown carrying light in the opposite direction from the BOIU 66a to intermediate terminal 22.

Figure 6:
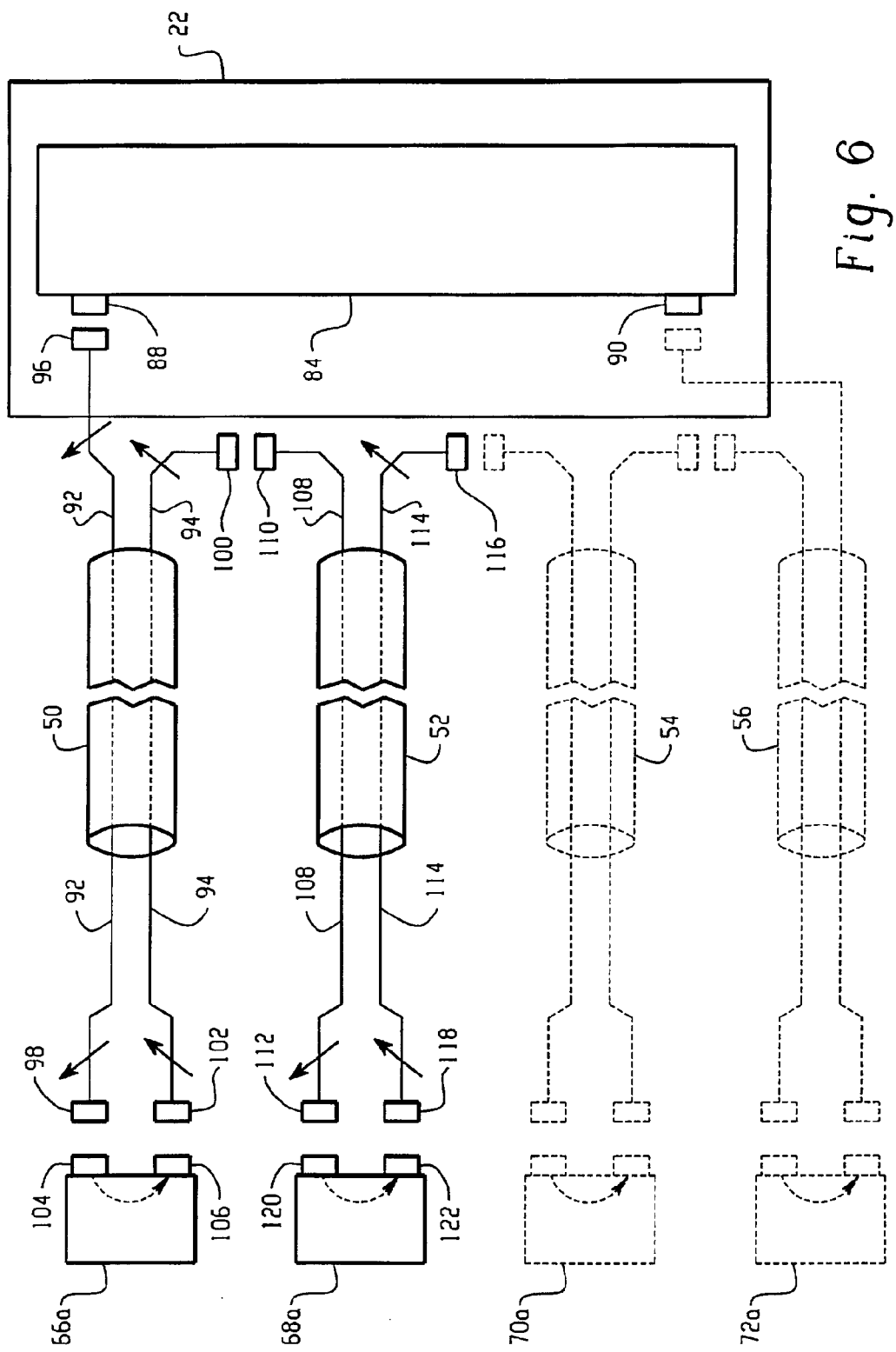
FIG. 6 is an enlarged illustration of how the optical loop is formed between BOIU 66 and 68 and the corresponding pairs of optical fibers 50 and 52.

Referring now to FIG. 6, there is shown a more detailed illustration of the connections between the optical equipment 84, fiber optical pairs 50 and 52 and the BOIU 66a and BOIU 68a. As shown, the first fiber 92 of optical pair 50 includes a "first" optical connector at the intermediate end of fiber 92 such as optical connector 96 at the end of optical fiber 92 which terminates in intermediate terminal 22. There is also included optical connector 98 on the destination terminal end of fiber 92 which terminates at BOIU 66a. Likewise, the second optical fiber 94 includes a "second" connector on the intermediate terminal 22 end of fiber 94 such as optical connector 100 at the end of optical fiber 94 and optical connector 102 on the other end which terminates at BOIU 66a. It is also noted that BOIU 66a includes an input optical connector 104 and an output optical connector 106 which are connected to optical connectors 98 and 102, respectively. Likewise, the optical pair 52 which extends between BOIU 68a and intermediate terminal 22 also includes a first optical fiber 108 having a "first" optical connector 110 at the end of fiber 108 which terminates in intermediate terminal 22 and an optical connector 112 at the end of fiber 108 which terminates at BOIU 68a. Similarly, the second optical fiber 114 of optical pair 52 includes a "second" optical connector 116 on the end which terminates at intermediate terminal 22 and optical connector 118 on the end of optical fiber 114 which terminates at the BOIU 68a. In the same manner as the BOIU 66a, BOIU 68a also includes an input terminal 120 and an output terminal 122.

Therefore, referring to FIGS. 5 and 6, it is seen that lightwaves carrying data information is provided at connector 88 of optical equipment 84. When optical connector 96 of fiber 92 is connected to optical connector 88 of optical equipment 84, light is provided from the unit 84 through the "first" optical fiber 92 to the BOIU 66a through connector 98 on fiber 92 to input optical connector 104 on BOIU 66a. As will be appreciated by those skilled in the art, data carried on "first" optical fiber 92 which is appropriate for or "addressed to" BOIU 66a will be extracted from the traveling lightwaves and put in suitable format for further transmission or use. In addition to extracting data from the light coming into BIOU 66 on optical fiber 92, BOIU 66a also inserts new data onto the light traveling through the unit which exits BIOU 66a on connector 106 to connector 102 and onto "second" fiber 94 of pair 50. Thus, new data inserted by BOIU 66a is now carried on "second" fiber 94 to connector 100 located in intermediate terminal 22. However, it is noticed that connector 100 is not connected to the optical equipment 84, but is instead connected to the "first" optical connector 110 on another "first" optical fiber 108 of fiber pair 52. Then, in the same manner as was discussed above with respect to BOIU 66a, light on "first" fiber 108 is connected through connector 112 at the destination terminal end to input connector 120 on BOIU 68a where the appropriate data for BIOU 68a is extracted and new data is injected onto the light and then the light is transmitted back out of output connector 122 on BOIU 68a to connector 118 of "second" fiber 114 of optical pair 52 to "second" connector 116 at the intermediate terminal end of optical fiber 114. "Second" optical connector 116 is then connected to a first optical connector on a first optical fiber of optical fiber pair 54 which extends from intermediate terminal 22 to BOIU 70a. After the data is extracted from the light on the first fiber of optical pair 54 and any new data is inserted onto the light traveling to the second fiber of optical pair 54, it is again routed back to the intermediate terminal 22 and then to the first fiber of optical pair 56 to BOIU 72a. The light coming from the output of BOIU 72a again travels back to the intermediate terminal 22 on the second fiber of pair 56 wherein the second fiber of optical pair 56 has a "second" connector at the intermediate end connected to the input terminal 90 of optical equipment 84. Thus, it is seen that there has been described a transmission loop which extends initially from the output connector 88 of optical equipment 84 through BOIU 66a back to intermediate terminal 22 then out to BOIU 68a back to intermediate terminal 22 then out to BOIU 70a then back to intermediate terminal 22 and then to BOIU 72a and back to intermediate terminal 22 where it is connected to the input terminal 90 of optical equipment 84.

In the embodiment illustrated in FIG. 5, there are a plurality of units similar to optical equipment 84, each of which is connected to a transmission loop with four separate BOIUs in the same manner as just discussed. For example, electrical equipment 86 in intermediate terminal 22 is part of the transmission loop made up by BOIU 74a, 76a, 78a and 80a along with corresponding optical fiber pairs 58, 60, 62 and 64. It will also be appreciated, that although in the embodiment discussed, there are four BOIUs for every piece of optical equipment in intermediate terminal 86, the number of BOIUs could be greater or less than four. It will also, of course, be appreciated that there are electrical connections between the optical to electrical equipment 82 and the optical equipment 84 and 86. Thus, there has been described a transmission path wherein a plurality of BOIU units are connected to a single piece of optical equipment at the intermediate terminal 22 by means of a serial transmission loop. As will be appreciated by those skilled in the art, it would be possible that a single communication channel could be handled by each of the BOIU units or a large number of channels could be handled. When the equipment is initially installed, a smaller number of channels would be handled by each BOIU unit in a transmission loop and as new customers request service, the number of channels handled by each BOIU unit in the loop could increase. Eventually the number of channels being serviced by each BOIU unit could increase to such a level that optical equipment unit 84 at the intermediate terminal 22 could no longer handle the volume. In such a case, one of the BOIU units may necessarily have to be taken out of the loop so that there might be only three BOIU units in the loop because of the increased traffic. The BOIU unit taken out of the overloaded transmission loop would then be combined into another transmission loop and perhaps with a new piece of optical equipment similar to that of optical equipment 84. It should be noted that each of the optical fiber pairs 50 through 56 are handling four times the number of channels because of the serial transmission loop than would be handled by each pair if each BOIU unit went to a separate piece of optical equipment such as optical equipment 84. Thus, it can be seen that as more and more service is demanded and added at the BOIU units, it is a simple matter to rearrange the transmission loops and add equipment only as it is needed.

Figure 7:
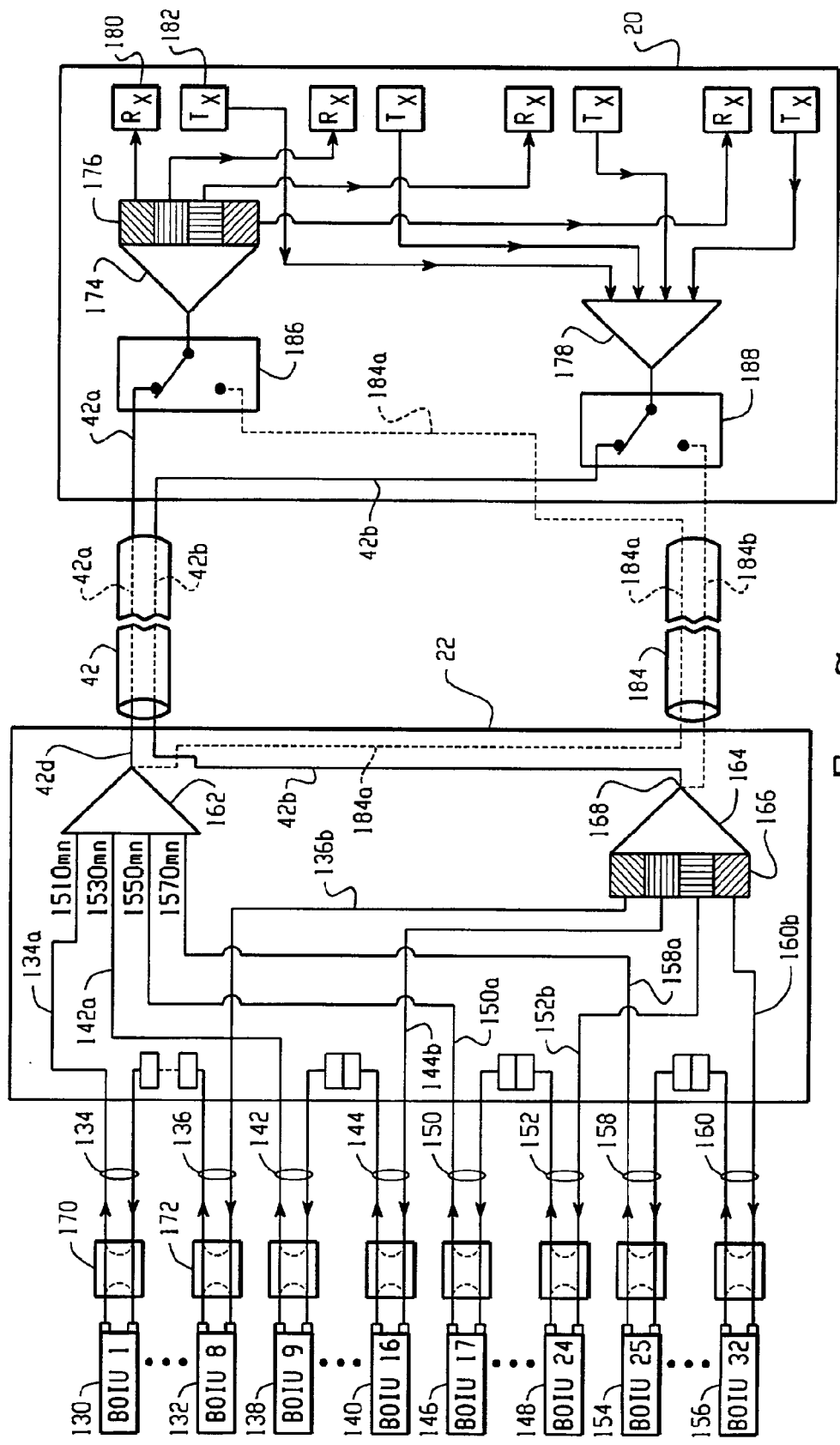
FIG. 7 illustrates another embodiment of the invention wherein the prior art passive optical system is upgraded to handle a large number of broadband subscribers by using 4 wavelengths of light, but continues to operate as a passive optical system.

FIG. 7 illustrate two embodiments for upgrading an optical system which does not require active elements, and only incorporates passive elements at the intermediate or remote distribution terminal. For example, instead of the active elements 82, 84 and 86 which converted data from optical signals to electrical signals and from electrical signals to optical signals, and as was discussed with respect to FIGS. 5 and 6, the embodiment of FIG. 7 use passive elements such as an optical coupler/splitter to combine various wavelengths of light arriving on a plurality of optical fibers such that all of the optical signals can be carried on a single optical fiber. Similarly, an optical coupler/splitter with CWDM (continuous wave division multiplexing) may be used to separate the different wavelengths of light carrying the various signals, one each onto a plurality of different optical fibers. As an example only, a single fiber may be used to carry light having a wavelength of 1,310 nanometers as is typically used for telephony service as well as four different wavelengths, such as 1,510, 1,530, 1,550 and 1,570 rather than a single nominal wavelength of 1,550 nanometers.

More specifically, and as shown in FIG. 7, central office 20 is connected to intermediate or remote distribution terminal 22 by at least two primary optical fibers such as optical fiber pair 42 which has individual fibers 42a and 42b. Intermediate terminal 22 is also connected to a plurality (such as thirty-two) of BOIU (broadband optical interface unit) by a like plurality of pairs of optical fibers. It should be noted that BOIU terminals 130 and 132 represent the first and eighth BOIUs forming a first optical loop of eight different BOIUs. The loop is connected by a corresponding eight pairs of optical fibers as represented by optical fiber pairs 134 and 136 in the same manner as the loop of four different BOIUs discussed with respect to FIGS. 5 and 6. Similarly, the ninth BOIU 138 and the sixteenth BOIU 140, along with a first optical fiber pair 142 and an eighth optical fiber pair 144 represent a second optical loop of eight additional BOIUs and their corresponding eight pairs of optical fibers.

Likewise, the seventeenth BOIU 146 and the twenty-fourth BOIU 148, along with the seventeenth and twenty-fourth pairs of optical fibers 150 and 152, respectively, represent a third optical loop of eight BOIUs. Finally, the twenty-fifth and thirty-second BOIUs 154 and 156, respectively, with their corresponding pairs of optical fibers 158 and 160 represent a fourth optical data loop. In the example as shown, each of the four optical data loops carry light at slightly different wavelengths. For example, in the embodiment shown the optical loops 1, 2, 3 and 4 operate at 1,510, 1,530, 1,550 and 1,570 nanometers of light, respectively.

As shown in FIG. 7, intermediate or remote distribution terminal 22 also includes an optical combination device or coupler 162 having its output side optically connected to optical fiber 42a of optical pair 42. Also as shown, the four inputs of optical coupler 162 are fibers 134a from optical fiber pair 134, optical fiber 142a from fiber pair 142, optical fiber 150a from fiber pair 150 and optical fiber 158a from fiber pair 150. Thus, it is seen that each of the four serial transmission loops has an input to the optical coupling device 162. In a similar manner, there is an optical separation or splitter 164 in combination with a four-way optical filter 166. The splitter/coupler 164 has its input 168 connected to optical fiber 42b of optical fiber 42. Each of the four outputs are connected to one output of the four-way filter 166 and are in turn connected one each to the last fiber of each of the four loops. For example, fiber 136b from the first loop is connected to the filter 166 and then to splitter/coupler 164 and the optical fiber 144b from the second optical loop is also connected to filter 166 and then to coupler 164. Likewise, optical fiber 152b from the third optical loop and optical fiber 160b from the fourth optical loop are connected through the filter 166 to the splitter/coupler 164. Thus, it is seen that by using a 4:1 splitter/couplers 162 and 164, and by putting eight BOIUs in each loop, all thirty-two of the BOIUs can be serviced.

Figure 8A:
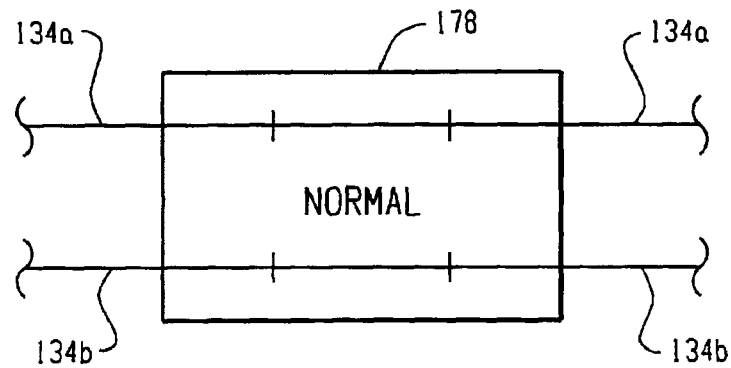
FIGS. 8A and 8B illustrate how the route protection switches operate so as to limit the number of customers or subscribers affected in the event of a failure of an OIU in one of the destination terminals of either of the embodiments shown in FIGS. 7 and 8.
Figure 8B:
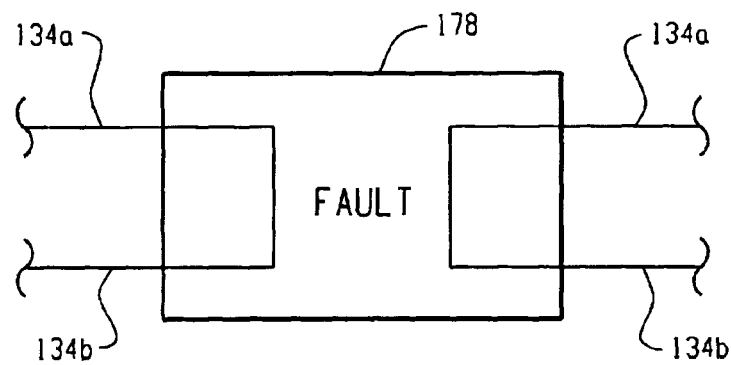

It should also be noted that there is a route protection switch such as switches 170 and 172 located between each of the BOIUs and their corresponding fiber optical pair. For example, protection switch 170 is located between BOIU 130 and optical pair 134. Likewise, route protection switch 172 is located between BOIU 132 and optical pair 136. The purpose of the route protection switches is that in the event a single BOIU, such as for example BOIU 130, were to fail, the route protection switch would operate to bypass that BOIU such that only the customers or subscribers associated with and receiving service through BOIU 30 would lose service. The fault protection switch simply bypasses BOIU 130 and couples the optical signal directly from the optical fiber 134a to optical fiber 134b of the optical pair 134. FIGS. 8A and 8B illustrate the normal light path and the fault light path, respectively, through the fault protection switches. Thus, the seven remaining BOIUs can continue to cover and provide service without interruption.

Also as shown, control office 20 includes an optical splitter/coupler 174 in combination with a CWDM filter 176 connected to optical fiber 42a of pair 42. Similarly, optical coupler/splitter 178 connected to optical fiber 42b of pair 42. Also as shown, there are four optical receivers and four optical transmitters such as receiver 180 and transmitter 182. Each of the four receivers and transmitters are for receiving and transmitting light having one of the four different wavelengths. Thus, each receiver such as receiver 180 is coupled to the wave division multiplexer filter 176 such that only light of the proper wavelength is directed to the proper receiver. Similarly, each transmitter is connected to optical coupler 178.

Figure 9:
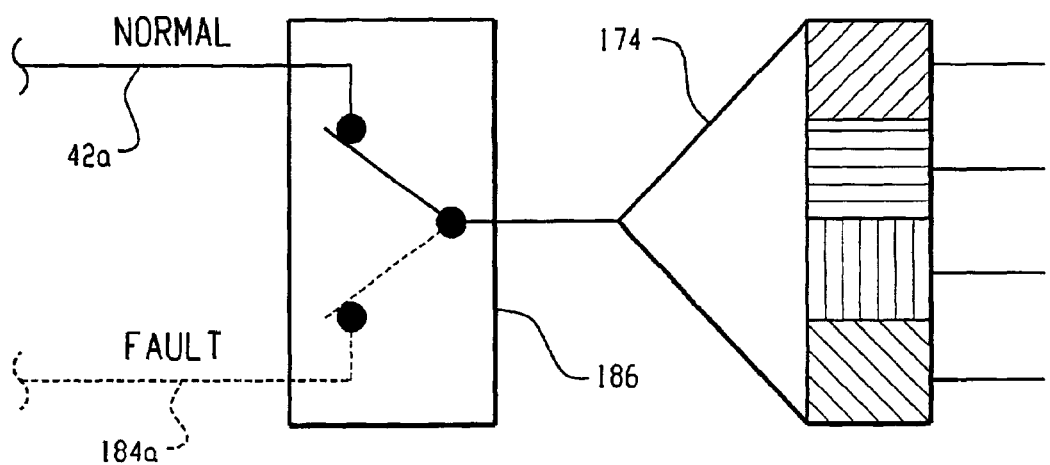
FIG. 9 illustrates the operation of the Route Protection switches which protect the system in the event the primary optical fiber failure between the intermediate terminal and the central office.

In an alternate embodiment, there may be a second pair 184 of primary fibers made up of fibers 184a and 184b. In the event there are two pairs of fibers extending between the intermediate or remote distribution terminal 22 in the central office 20, redundancy may be provided such that if a fiber in the first primary pair 42 were to be cut or otherwise damaged, a fiber in the second fiber pair 184 can take over. This is accomplished by a pair of route protection switches 186 and 188 which are connected so that if, for example, fiber 42a of pair 42 were to be damaged or separated, switch 186 would activate such that the input of the optical coupler/splitter 174 would be connected to optical fiber 184a of fiber pair 184 rather than fiber 42a of pair 42. Likewise, if optical fiber 42b were to be severed or damaged, then switch 188 would activate such that the output of optical coupler 178 is routed to fiber 184b of pair 184 rather than to optical fiber 42b of pair 42. FIG. 9 illustrates the normal and fault positions of the route protection switches. It should be also be noted, however, that this alternate embodiment also requires that the optical coupler/splitter 162 and 164 discussed with respect to intermediate terminal 22 should have two outputs rather than a single output as was discussed before. That is, the optical coupler/splitters should be a 4:2 rather than a 4:1 splitter/coupler. Thus, it is seen there has been described a method of using existing fiber optical pairs to upgrade a system to a passive system with minimal change of equipment and no additional fibers required to be installed.

Figure 10:
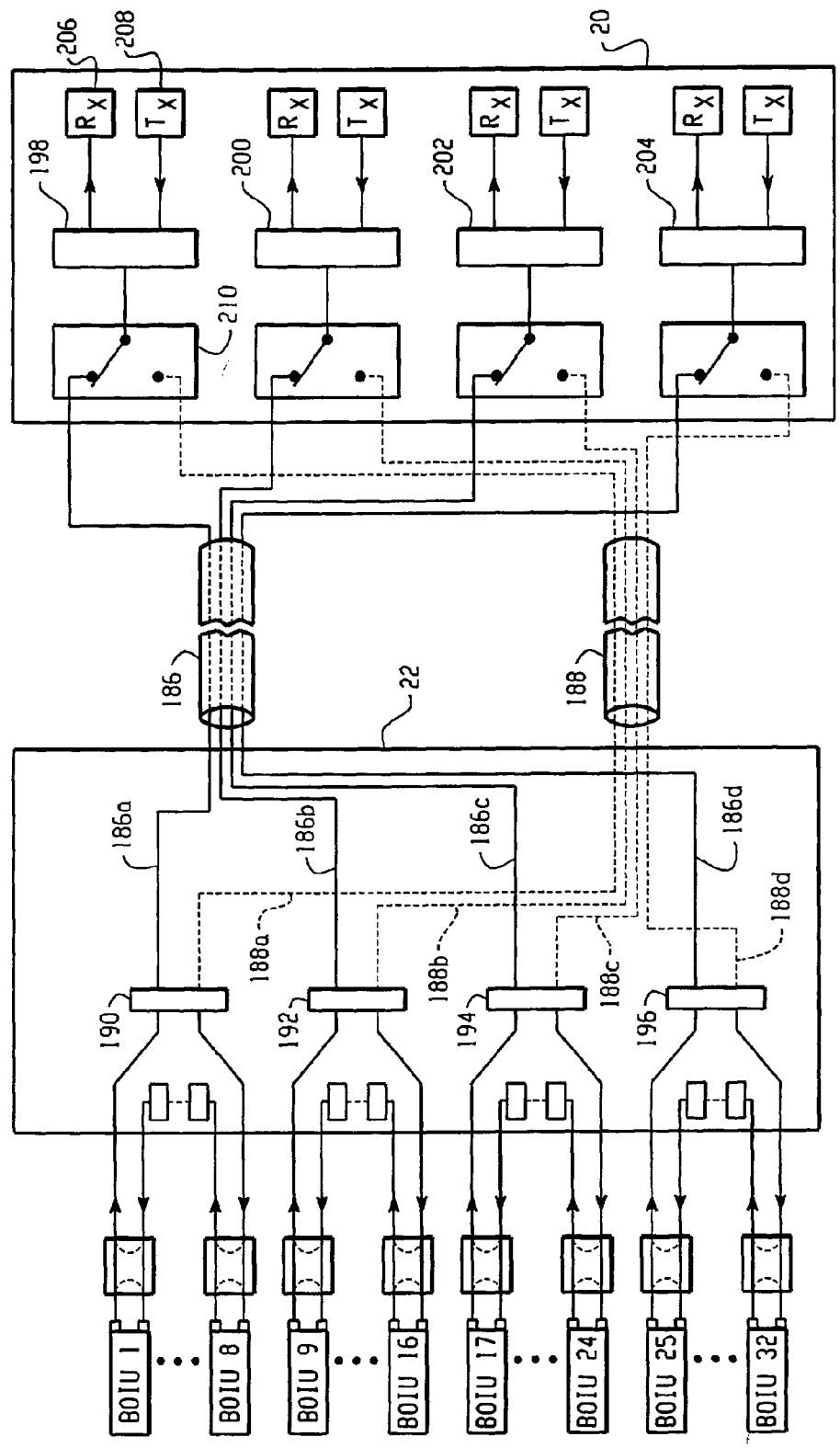
FIG. 10 illustrates an upgrade similar to that of FIG. 7 but uses only two wavelengths of light and an additional pair of optical fibers between the intermediate terminal and the primary terminal.

Referring now to FIG. 10, there is shown still another alternate embodiment of the present invention where only two single wavelengths of light 1,550 and 1,310 are used. It is noted that the four optical loops are substantially the same as discussed with respect to FIG. 6. However, instead of a single pair 42 of fibers 42a and 42b, the primary optical fiber bundle 186 is not made up of two fibers but is made up of four fibers 186a, 186b, 186c and 186d. Further, if there is to be redundancy of the primary fiber 186, it will be necessary to include a second four-fiber bundle 188 made up of fibers 188a, 188b, 188c and 188d. In such an arrangement, it is not necessary to use the CWDM filters; it is only necessary to use a 2×2 optical coupler/splitter as indicated by optical coupler/splitters 190, 192, 194 and 196 in intermediate terminal 22, and 2×2 optical coupler/splitter 198, 200, 202 and 204 in central office. Thus, in this arrangement, there is a fiber dedicated for each of the terminal loops each of which carries eight BOIUs. Likewise at the central office 20 in end of fibers 186 and 188, each of the fibers are connected to its own receiver and transmitter, such as receiver 206 and transmitter 208. To achieve redundancy in the event of a primary fiber bundle failure in this embodiment, there is also included four route protection switches such as switch 210 which operate similarly to the switches 186 and 187 with respect to FIG. 7 above. Thus, in the event of one of the primary fibers of optical bundle 186, the appropriate switch, such as switch 210, would switch positions such that the information is now routed through the appropriate fiber of fiber bundle 188 and then back to its appropriate optical splitter 190.

The corresponding structures, materials, acts and equivalents of all means or step; plus function elements in the claims below are intended to include any structure, material, or act for performing the function in combination with other claimed elements as specifically claimed.

What is claimed is:

1. In an existing optical network comprising a multiplicity of destination terminals, an intermediate terminal, and a primary terminal, each of said multiplicity of destination terminals including an optical interface unit (OIU) having an OIU input optical connector and an OIU output optical connector and each OIU for extracting data on lightwaves received at said OIU input optical connector and injecting data onto lightwaves transmitted from said OIU output optical connector, each of said destination terminals having a corresponding pair of optical fibers extending to said intermediate terminal, each of said corresponding pairs of optical fibers including a first fiber and a second fiber, and each of said OIU connected by said OIU input optical connector and said OIU output optical connector to each corresponding first fiber and second fiber, and said intermediate terminal connected to said primary terminal by at least a primary pair of optical fibers, apparatus for providing optical data transmission comprising:

a first conversion circuit located in said intermediate terminal having a first conversion input optical connector and a first conversion output optical connector, said first conversion circuit for converting optical data to electrical data and electrical data to optical data, said first conversion circuit further including electrical connections;

a transmission loop comprising said multiplicity of destination terminals and said corresponding pairs of optical fibers wherein;

at each of said multiplicity of destination terminals, said first fiber of said corresponding pair of optical fibers connected to said OIU output optical connector, and said second fiber of said corresponding pair of optical fibers connected to said OIU input optical connector; and at said intermediate terminal said first fibers of said corresponding pairs of optical fibers connected to said second fibers of other of said corresponding pairs of optical fibers, except said first optical fiber of one of said corresponding pairs of optical fibers is connected to said first conversion input optical connector and said second optical fiber of another one of said corresponding pairs of optical fibers is connected to said first conversion output optical connector; and a second conversion circuit located in said intermediate terminal for converting optical data to electrical data and electrical data to optical data and electrically connected to said electrical connections of said first conversion circuit, said second conversion circuit also optically connected to said primary pair of optical fibers extending between said intermediate terminal and said primary terminal.

2. In an existing optical network comprising a multiplicity of destination terminals, each of said destination terminal having a corresponding pair of optical fibers, each corresponding pair of optical fibers having a first fiber and a second fiber, and each of said destination terminals connected to an intermediate terminal by its corresponding pair of optical fibers, and said intermediate terminal connected to a primary terminal by at least a pair of primary optical fibers, apparatus for providing upgraded optical data transmission comprising:

a first conversion circuit located in said intermediate terminal having a first conversion output optical connector and a first conversion input optical connector for connecting optical fibers to optically transmit and receive bidirectional data between said intermediate terminal and said multiplicity of destination terminals, said first conversion circuit for converting optical data to electrical data and electrical data to optical data, said first optical conversion circuit further including electrical connections;

a first optical interface unit (OIU) and a last OIU, said first and last OIUs located in a first destination terminal and a last destination terminal, respectively, said first and last destination terminals included in said multiplicity of destination terminals, each of said first and last OIUs; including an input optical connector and an output optical connector, said first and last OIUs for extracting and inserting data on lightwaves traveling over optical fibers, and said lightwaves being received at said input optical connectors and transmitted from said output connectors of said first and last OIUs, wherein:

said first fiber of said corresponding pair of optical fibers of said first destination terminal is connected to said first conversion output optical connector of said first conversion circuit, and said second fiber of said corresponding pair of optical fibers of said last destination terminal connected to said first conversion input optical connector of said first conversion circuit, the second fiber of said corresponding pair of optical fibers of said first destination terminal and the first fiber of said corresponding pair of optical fibers of said last destination terminal connected so as to form a series optical loop extending between said first conversion output optical connector of said first conversion circuit and at least through said first and last destination terminals and back to said first conversion input optical connector of said first conversion circuit; and a second conversion circuit located in said intermediate terminal for converting optical data to electrical data and electrical data to optical data, and electrically connected to said first conversion circuit, said second conversion circuit also optically connected to said pair of primary optical fibers extending between said intermediate terminal and said primary terminal.

3. The apparatus of claim 2 wherein said second fiber or said corresponding pair of optical fibers of said first destination terminal and said first fiber of said corresponding pair of optical fibers of said last destination terminal are connected directly to each other.

4. The apparatus of claim 2 wherein said optical interface unit is a broadband optical interface unit.

5. An apparatus for facilitating optical communication between a first terminal and a first remote optical interface unit (OIU) and a second remote OIU, each remote OIU having an OIU optical input and an OIU optical output, the first and second remote OIUs associated with a first pair and a second pair of optical fibers, respectively, each pair of optical fibers comprising a first fiber and a second fiber, the apparatus comprising:

an optical communication unit located within the first terminal and having an optical communication unit input and an optical communication output, wherein:
the OIU optical input of first remote OIU is connected to the optical communication output of the optical communication unit by the first fiber of the first pair of optical fibers;
the OIU optical output of the second remote OIU is connected to the optical communication input of the optical communication unit by the second fiber of the second pair of optical fibers;

the OIU optical output of first remote OIU is connected to the second fiber of the first pair of optical fibers;

the OIU optical input of second remote OIU is connected to the first fiber of the second pair of optical fibers; and the second fiber of the first pair of optical fibers and the first fiber of the second pair of optical fibers define an optical communication loop separate from the optical communication unit;

wherein the optical communication loop is defined by the second fiber of the first pair of optical fibers and the first fiber of the second pair of optical fibers by directly connecting the second fiber of the first pair of optical fibers to first fiber of the second pair of optical fibers.

6. The apparatus of claim 5, wherein the optical communication loop is defined by the second fiber of the first pair of optical fibers and the first fiber of the second pair of optical fibers by intermediate OIUs each having an OIU optical input and an OIU optical output and each intermediate OIU having a corresponding pair of optical fibers comprising a first fiber and a second fiber.

7. The apparatus of claim 5, wherein the first and second OIUs are broadband OIUs.

8. The apparatus of claim 5, further comprising at least one optical bypass switch associated with one of the first or second remote OIUs and connected across the corresponding first or second pair of optical fibers.

* * * * *